(12) United States Patent
Laurita

(10) Patent No.: US 9,108,663 B1
(45) Date of Patent: Aug. 18, 2015

(54) METHOD AND APPARATUS FOR BEACH SLED

(71) Applicant: Joseph N. Laurita, Wayne, NJ (US)

(72) Inventor: Joseph N. Laurita, Wayne, NJ (US)

( * ) Notice: Subject to any disclaimer, the term of this patent is extended or adjusted under 35 U.S.C. 154(b) by 0 days.

(21) Appl. No.: 14/305,106

(22) Filed: Jun. 16, 2014

(51) Int. Cl.
  *B62B 1/18* (2006.01)
  *B62B 13/18* (2006.01)
  *B62B 3/04* (2006.01)

(52) U.S. Cl.
  CPC .. *B62B 13/18* (2013.01); *B62B 3/04* (2013.01)

(58) Field of Classification Search
  CPC ........ B62B 2202/52; B62B 13/18; B62B 1/18
  USPC .................. 280/8, 9, 32.6, 47.34, 79.11, 79.7
  See application file for complete search history.

(56) References Cited

U.S. PATENT DOCUMENTS

| 4,863,075 A * | 9/1989 | Romer | 222/610 |
| 5,092,615 A * | 3/1992 | Gregalis | 280/30 |
| 2002/0125668 A1 * | 9/2002 | Sims | 280/47.26 |
| 2011/0177733 A1 * | 7/2011 | Grimes | 441/80 |

* cited by examiner

*Primary Examiner* — J. Allen Shriver, II
*Assistant Examiner* — Bryan Evans
(74) *Attorney, Agent, or Firm* — Walter J. Tencza, Jr.

(57) ABSTRACT

An apparatus including a top plate, a right spacing member, a left spacing member, left and right sides plate having a length and a width, wherein the length of each of the left side plate and the right side plate is substantially greater than the width of each of the left side plate and the right side plate. The apparatus may further include first, and second wheels connected to the left side plate so that the first and second wheels can rotate about first and second axes which are substantially parallel to the width of the left side plate; and third and fourth wheels connected to the right side plate so that the third and fourth wheels can rotate about third and fourth axes which are substantially parallel to the width of the right side plate.

20 Claims, 11 Drawing Sheets

METHOD AND APPARATUS FOR BEACH SLED

FIELD OF THE INVENTION

This invention relates to improved methods and apparatus concerning devices for transporting many objects, such as when going to a beach.

BACKGROUND OF THE INVENTION

There are various devices known in the prior art for transporting many items to a beach. Many of these devices function only by rolling on wheels along a hard surface road. When a person reaches a sandy surface of a beach the devices need to be physically picked up, because the wheels get stuck or hesitate in the sand.

SUMMARY OF THE INVENTION

In at least one embodiment an apparatus is provided comprising a top plate, a right spacing member, a left spacing member, a left side plate having a length and a width, wherein the length of the left side plate is substantially greater than the width of the left side plate, and a right side plate having a length and a width, wherein the length of the right side plate is substantially greater than the width of the right side plate.

The apparatus may further include a first wheel connected to the left side plate so that the first wheel can rotate about a first axis which is substantially parallel to the width of the left side plate; a second wheel connected to the left side plate so that the second wheel can rotate about a second axis which is substantially parallel to the width of the left side plate; a third wheel connected to the right side plate so that the third wheel can rotate about a third axis which is substantially parallel to the width of the right side plate; and a fourth wheel connected to the right side plate so that the fourth wheel can rotate about a fourth axis which is substantially parallel to the width of the right side plate. The top plate may be connected to the left side plate by the left spacing member, so that the top plate is spaced apart from the left side plate; and the top plate is connected to the right side plate by the right spacing member, so that the top plate is spaced apart from the right side plate.

In at least one embodiment, the left side plate includes a left side flat surface portion between the first wheel and the second wheel, which is greater in length than the diameter of either the first wheel or the second wheel, and wherein the first wheel and the second wheel rotate on the first axis and the second axis, respectively, in a plane which is perpendicular to the left side flat surface portion. In at least one embodiment, the right side plate includes a right side flat surface portion between the third wheel and the fourth wheel, which is greater in length than the diameter of either the third wheel or the fourth wheel, and wherein the third wheel and the fourth wheel rotate on the third axis and the fourth axis, respectively, in a plane which is perpendicular to the right side flat surface portion.

The top plate may be about ten inches in width; and the left side plate may be about four inches in width; the right side plate may be about four inches in width. The right spacing member may space the top plate away from the right side plate about six inches; and the left spacing member may space the top plate away from the left side plate about six inches.

The left side plate may include a first slot, and wherein the first wheel is connected to the left side plate so that the first wheel has a portion which sits in the first slot, a portion which is above the first slot, and a portion which is below the first slot. The left side plate may include a second slot, and wherein the second wheel is connected to the left side plate so that the second wheel has a portion which sits in the second slot, a portion which is above the second slot, and a portion which is below the second slot.

The right side plate may include a third slot, and wherein the third wheel is connected to the right side plate so that the third wheel has a portion which sits in the third slot, a portion which is above the third slot, and a portion which is below the third slot. The right side plate may include a fourth slot, and wherein the fourth wheel is connected to the right side plate so that the fourth wheel has a portion which sits in the fourth slot, a portion which is above the fourth slot, and a portion which is below the fourth slot.

The top plate may be substantially perpendicular to the left side plate and the right side plate. The apparatus may further include a rope; and a means for attaching the rope to the top plate, such that the rope can be used to pull a combination of the top plate, left spacing member, right spacing member, left side plate, and the right side plate. The means for attaching the rope to the top plate may include at least one opening in the top plate.

The top plate may have a lip portion which protrudes out beyond an end of the left side plate, and out beyond an end of the right side plate. The at least one opening in the top plate may be located in the lip portion. The top plate may include a plurality of further openings; and each of the plurality of further openings is substantially larger than the at least one opening. The top plate may have a length and a width, wherein the length of the top plate is substantially greater than the width of the top plate; and each of the plurality of further openings may be located centrally with respect to the width of the top plate.

In at least one embodiment a method is provide including loading an apparatus with a plurality of items; pulling the apparatus with the plurality of items along a hard road surface so that first, second, third, and fourth wheels of the apparatus roll; and thereafter pulling the apparatus with the plurality of items along a beach surface so that the first, second, third, and fourth wheels contact the beach surface. The apparatus may be of a configuration as previously described.

DETAILED DESCRIPTION OF THE DRAWINGS

Figure 1:
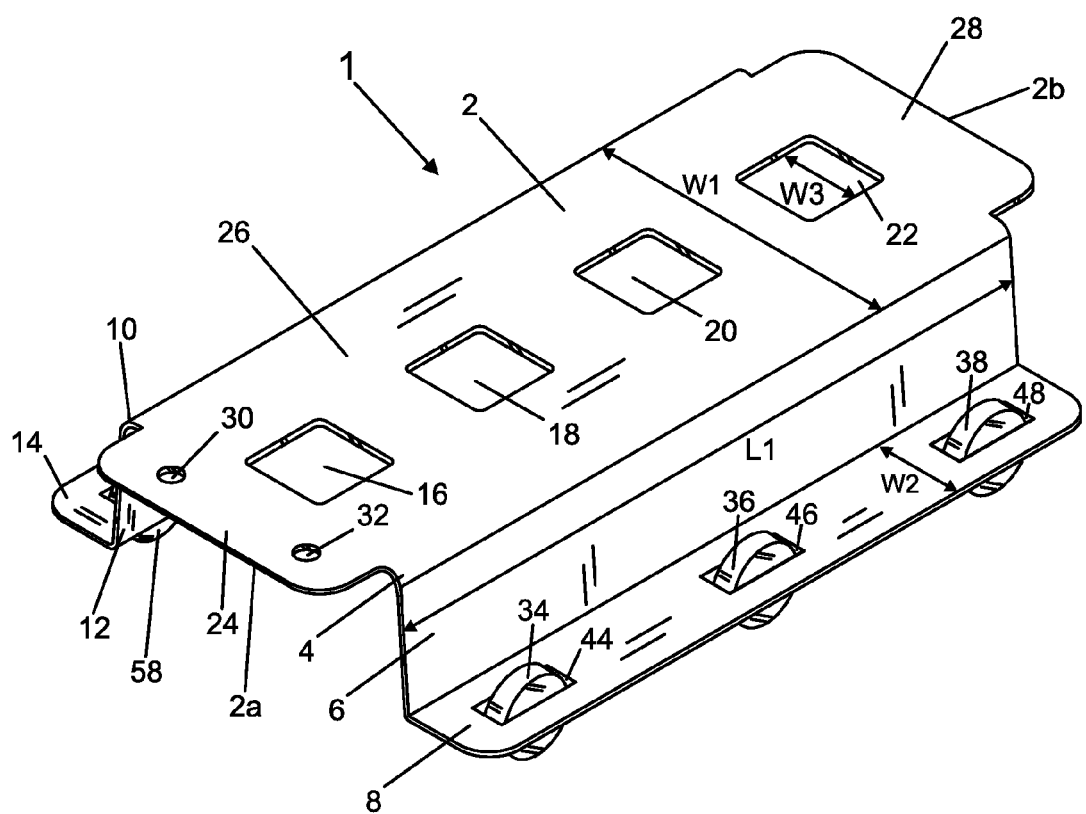
FIG. 1 shows a front, right, and top perspective view of an apparatus in accordance with an embodiment of the present invention.
Figure 2:
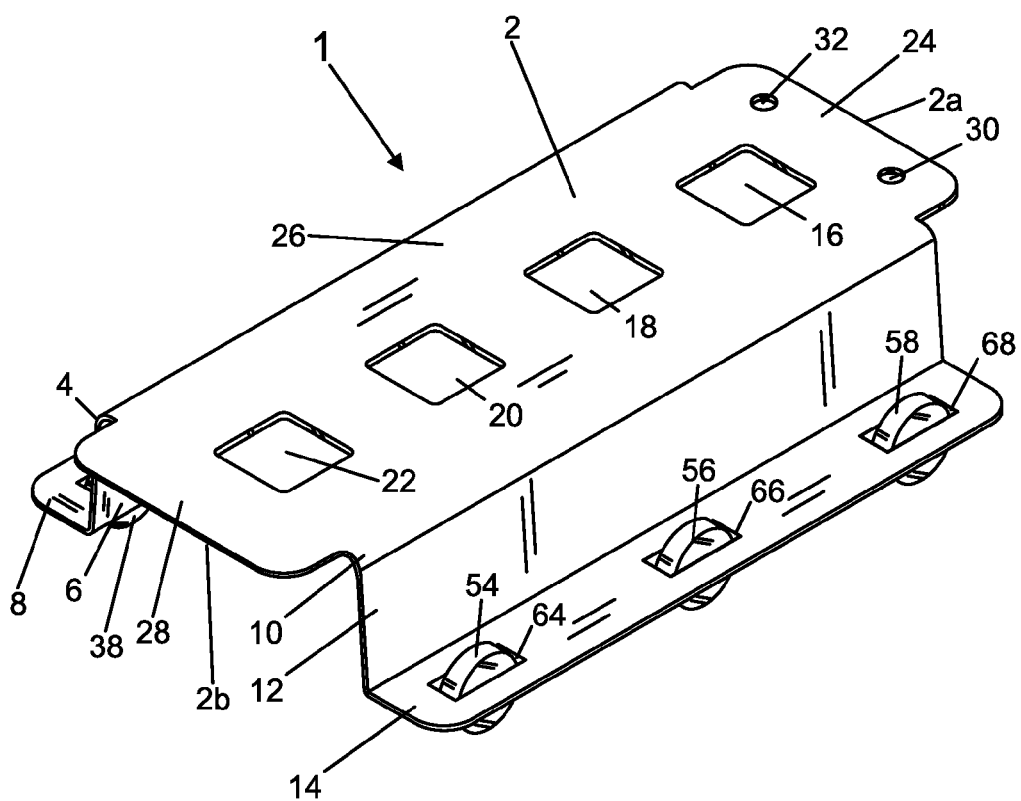
FIG. 2 shows a rear, left, and top perspective view of the apparatus of FIG. 1.
Figure 3:
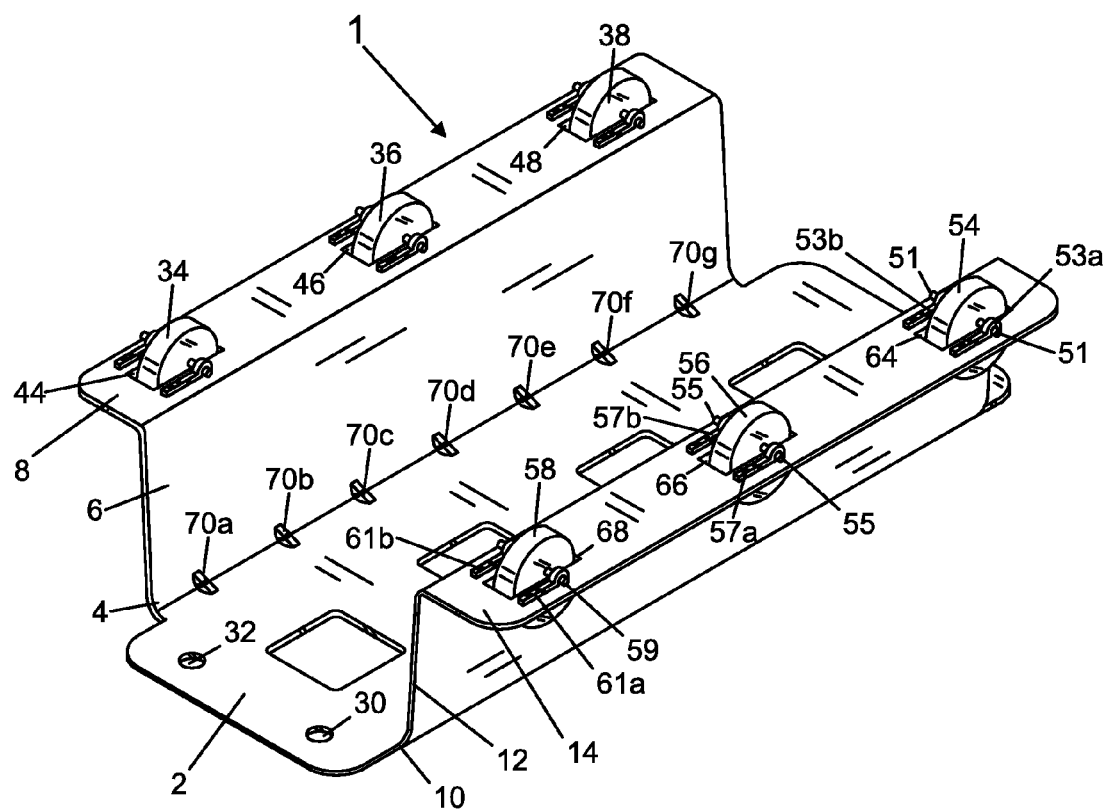
FIG. 3 shows a front, left, and bottom perspective view of the apparatus of FIG. 1.
Figure 4:
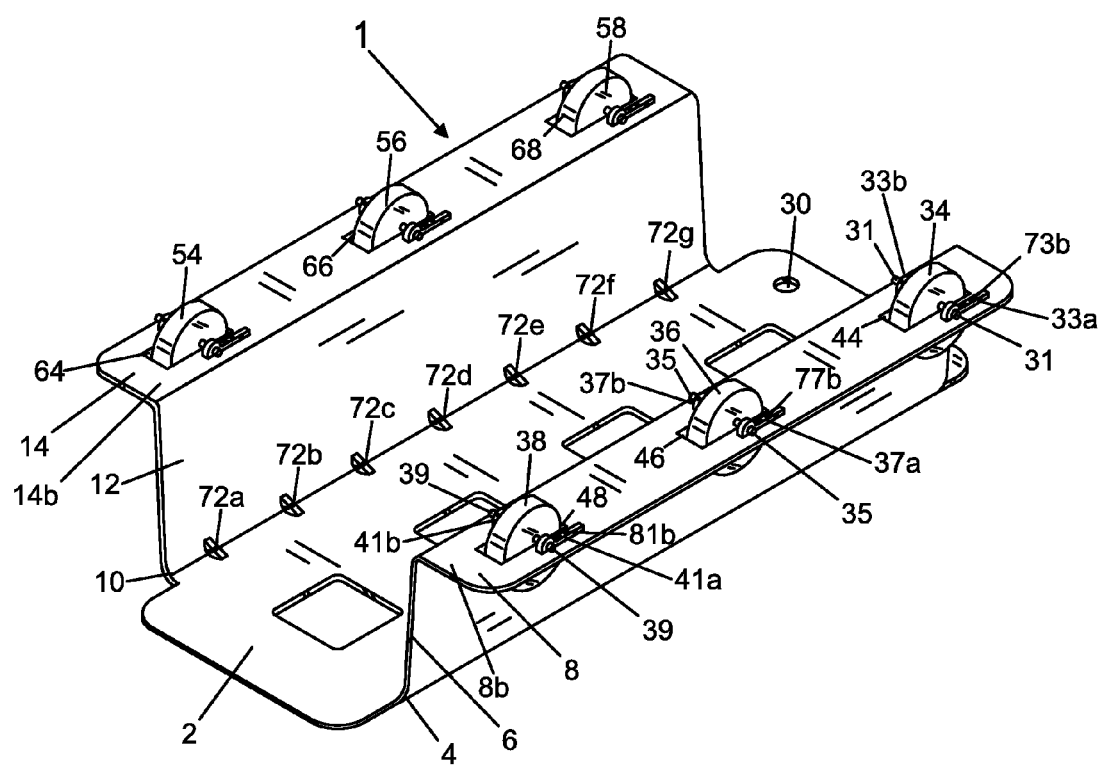
FIG. 4 shows a rear, right, and bottom perspective view of the apparatus of FIG. 1.
Figure 5:
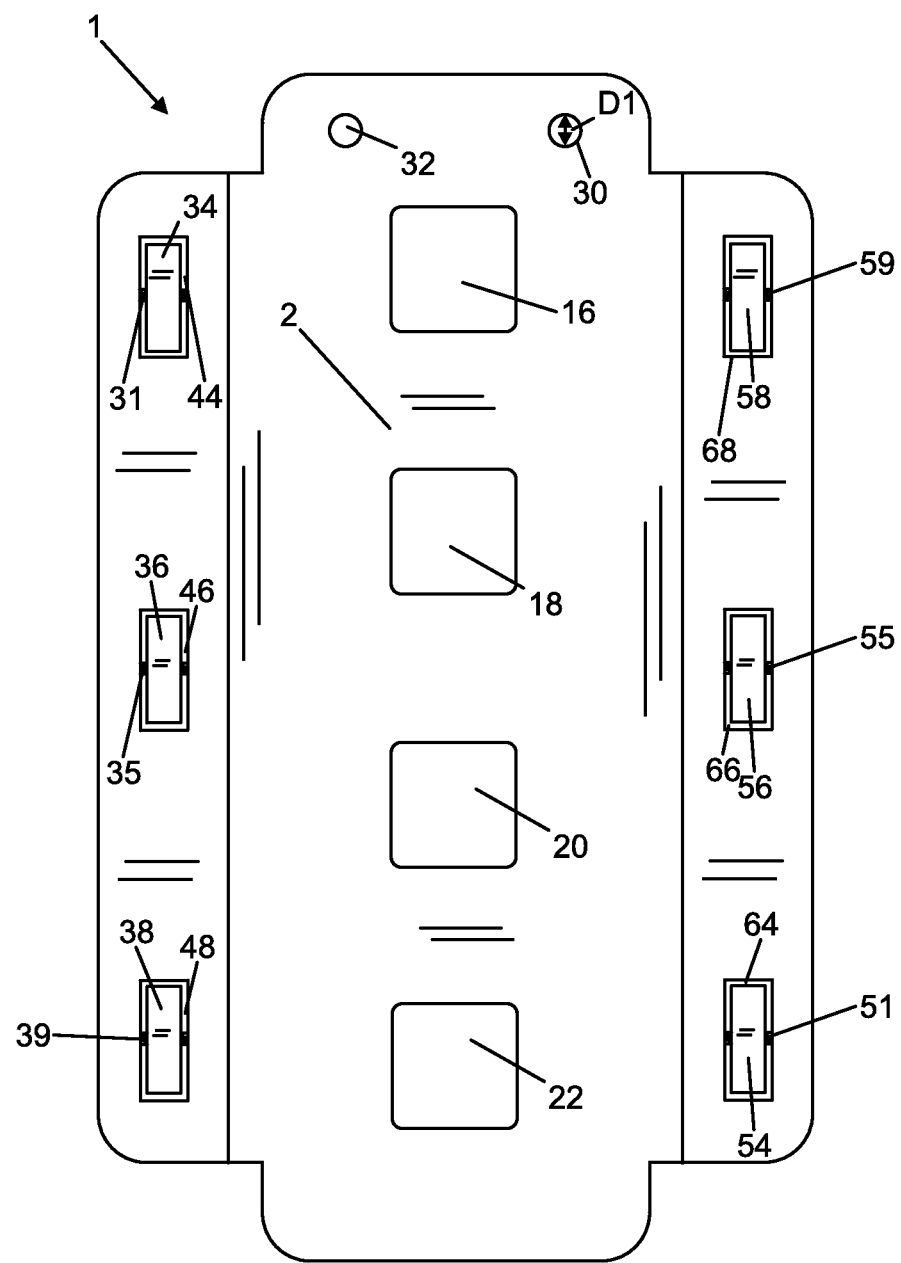
FIG. 5 shows a top view of the apparatus of FIG. 1.
Figure 6:
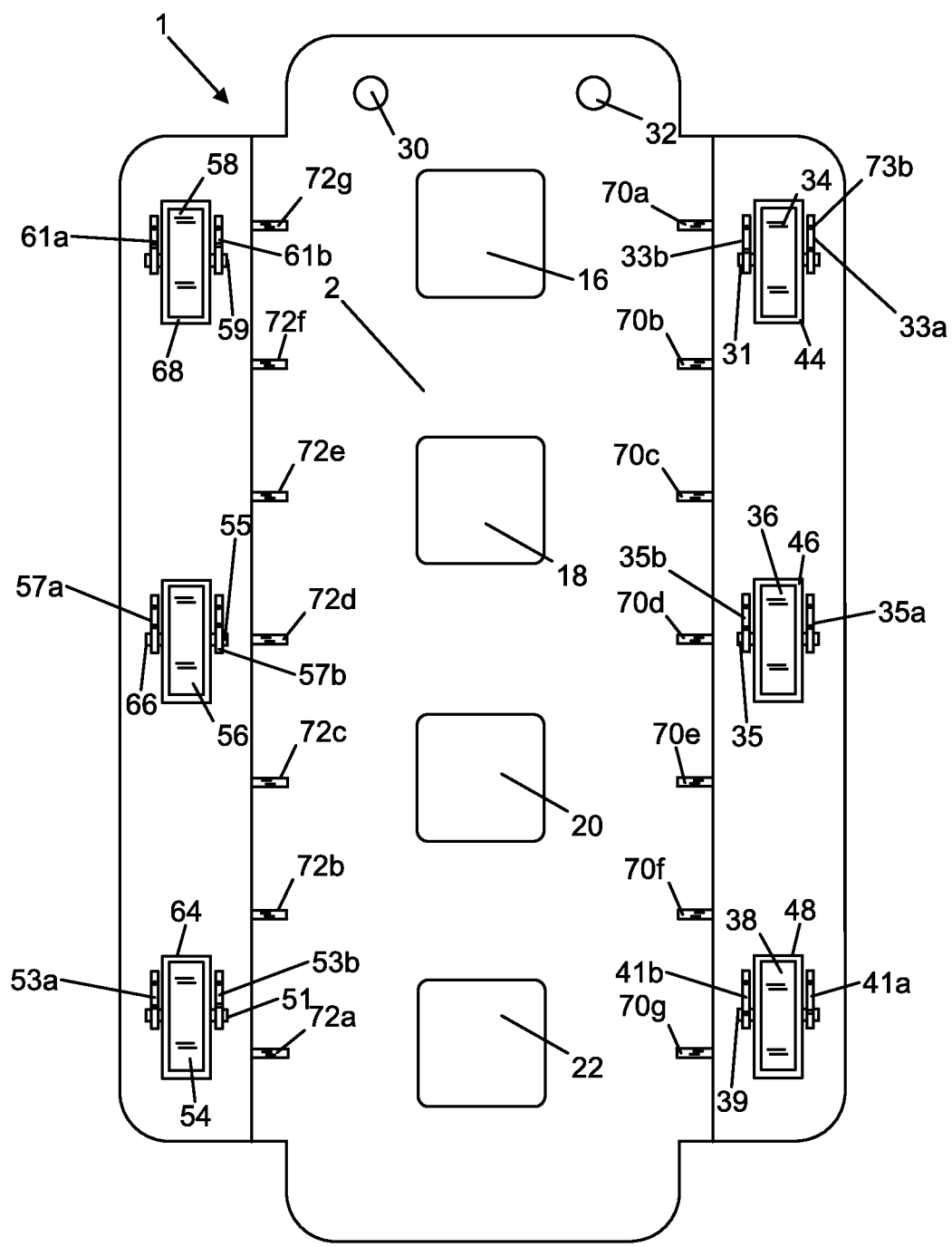
FIG. 6 shows a bottom view of the apparatus of FIG. 1.
Figure 7:
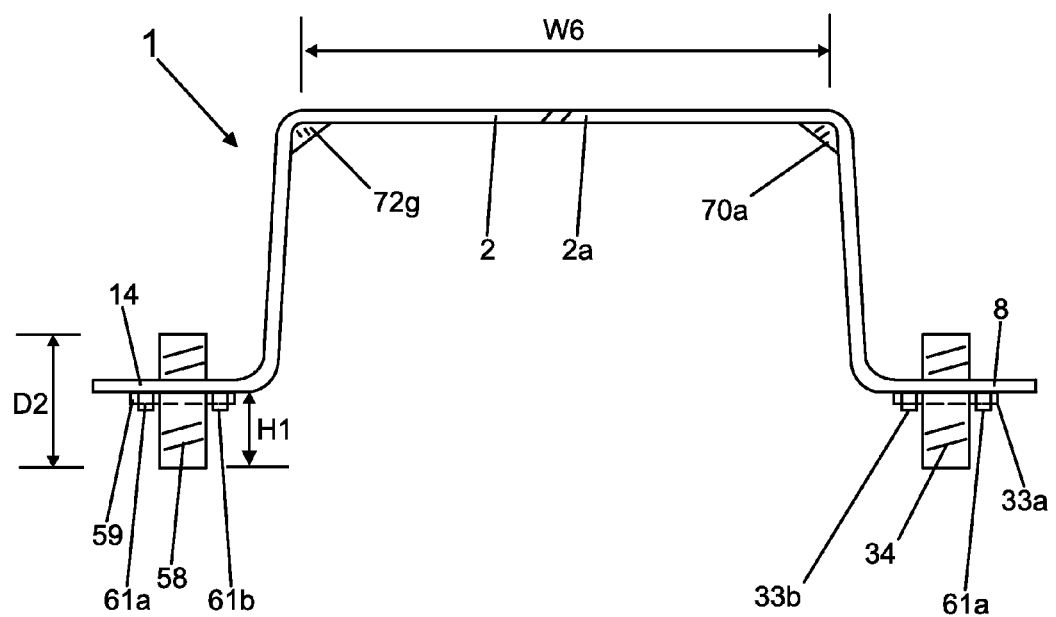
FIG. 7 shows a front view of the apparatus of FIG. 1.
Figure 8:
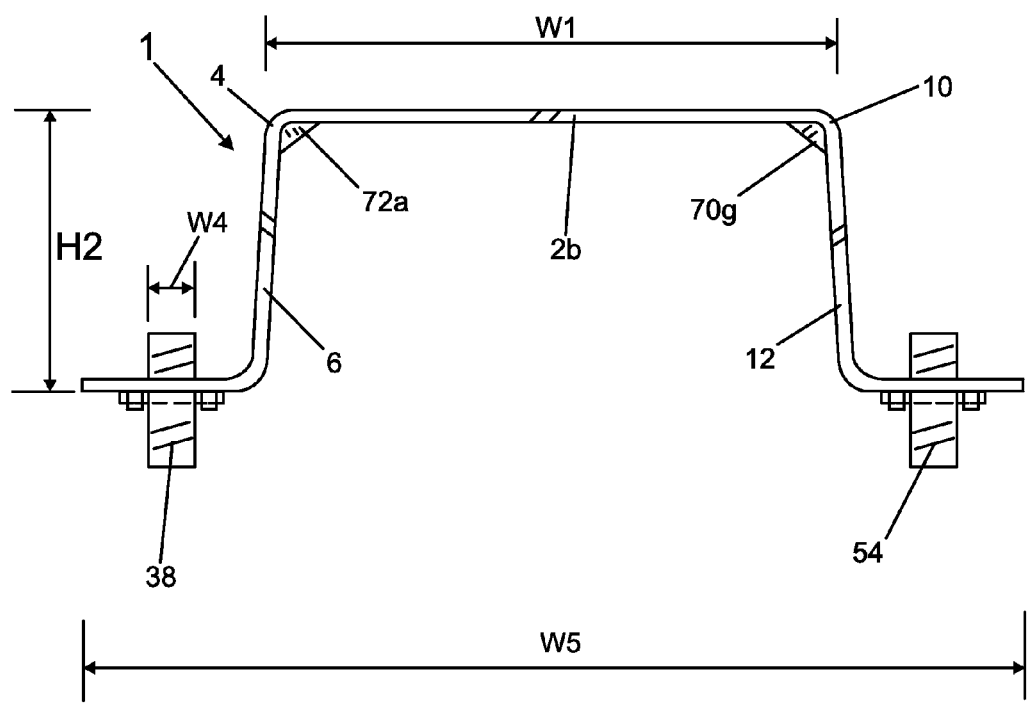
FIG. 8 shows a rear view of the apparatus of FIG. 1.
Figure 9:
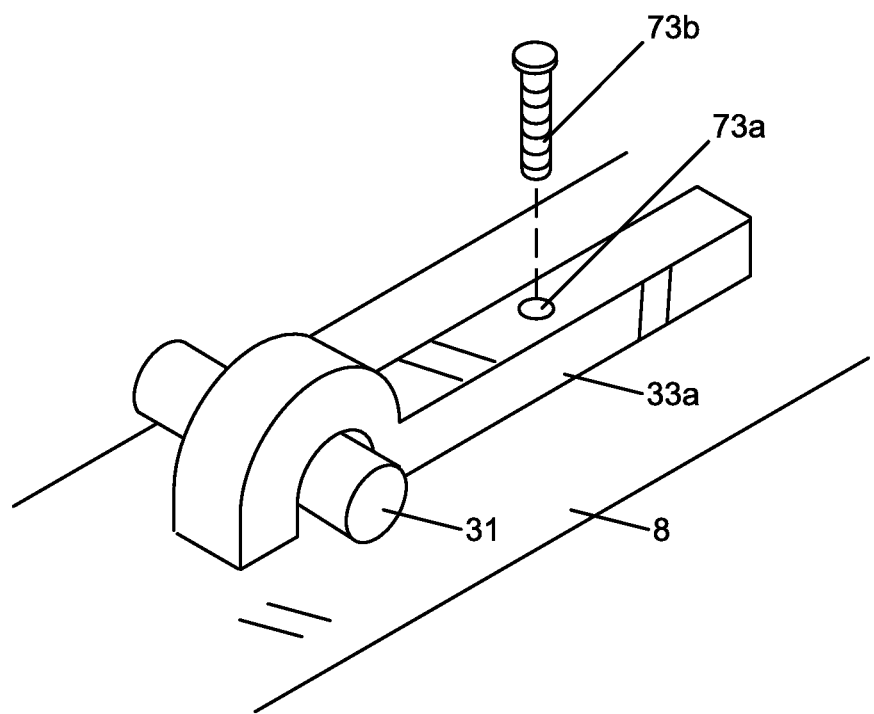
FIG. 9 shows a close up perspective view of some of the components of the apparatus of FIG. 1.

FIG. 1 shows a front, right, and top perspective view of an apparatus 1 in accordance with an embodiment of the present invention. FIG. 2 shows a rear, left, and top perspective view of the apparatus 1. FIG. 3 shows a front, left, and bottom perspective view of the apparatus 1. FIG. 4 shows a rear, right, and bottom perspective view of the apparatus 1. FIG. 5 shows a top view of the apparatus 1. FIG. 6 shows a bottom view of the apparatus 1. FIG. 7 shows a front view of the apparatus 1. FIG. 8 shows a rear view of the apparatus 1. FIG. 9 shows a close up perspective view of some of the components of the apparatus 1.

Referring to FIGS. 1-4, the apparatus 1 includes a top plate 2, a right curved portion 4, a right slanted portion 6, a right side plate 8, a left curved portion 10, a left slanted portion 12, and a left side plate 14. The apparatus 1 further includes wheels 34, 36, and 38 shown in FIG. 1, and wheels 54, 56, and 58 shown in FIG. 2. The right curved portion 4 and the right slanted portion 6, together, may be called a right spacing member, which spaces the top plate 2 from the right side plate 8. The left curved portion 10 and the left slanted portion 12, together, may be called a left spacing member, which spaces the top plate 2 from the left side plate 14.

Figure 10:
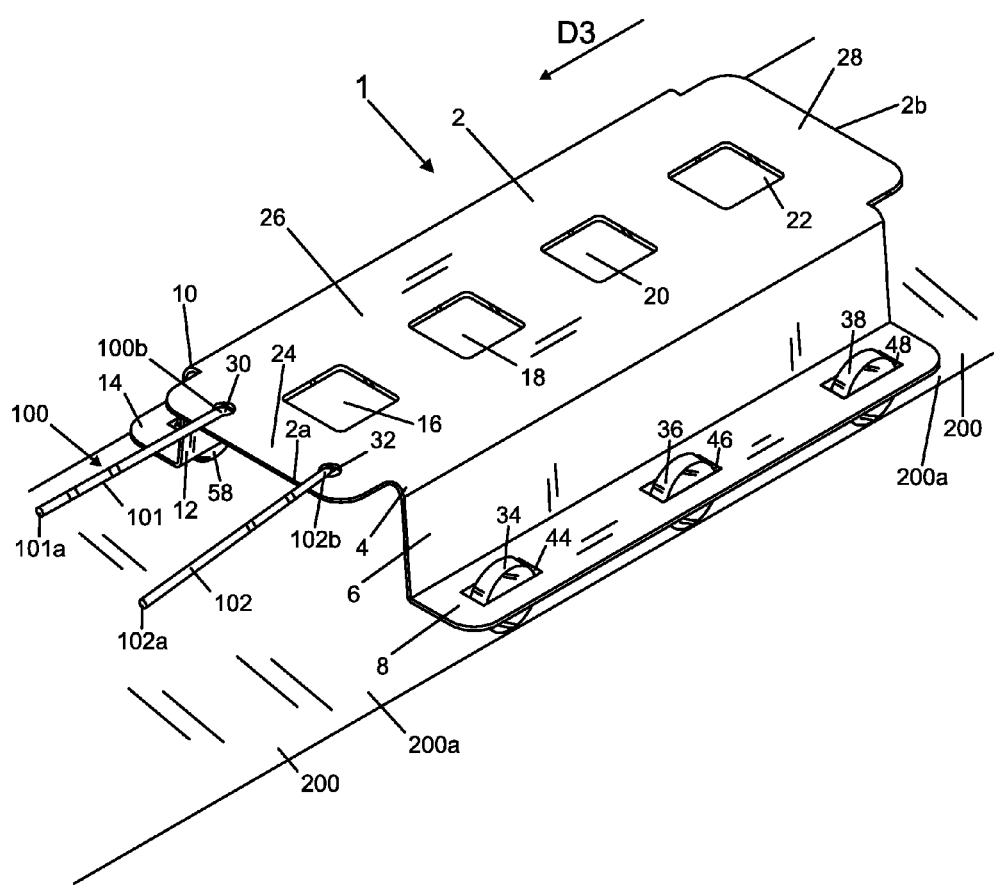
FIG. 10 shows a front, right, and top perspective view of the apparatus of FIG. 1, along with a rope connected to the apparatus of FIG. 1, and with the apparatus resting on a flat, hard road surface.
Figure 11:
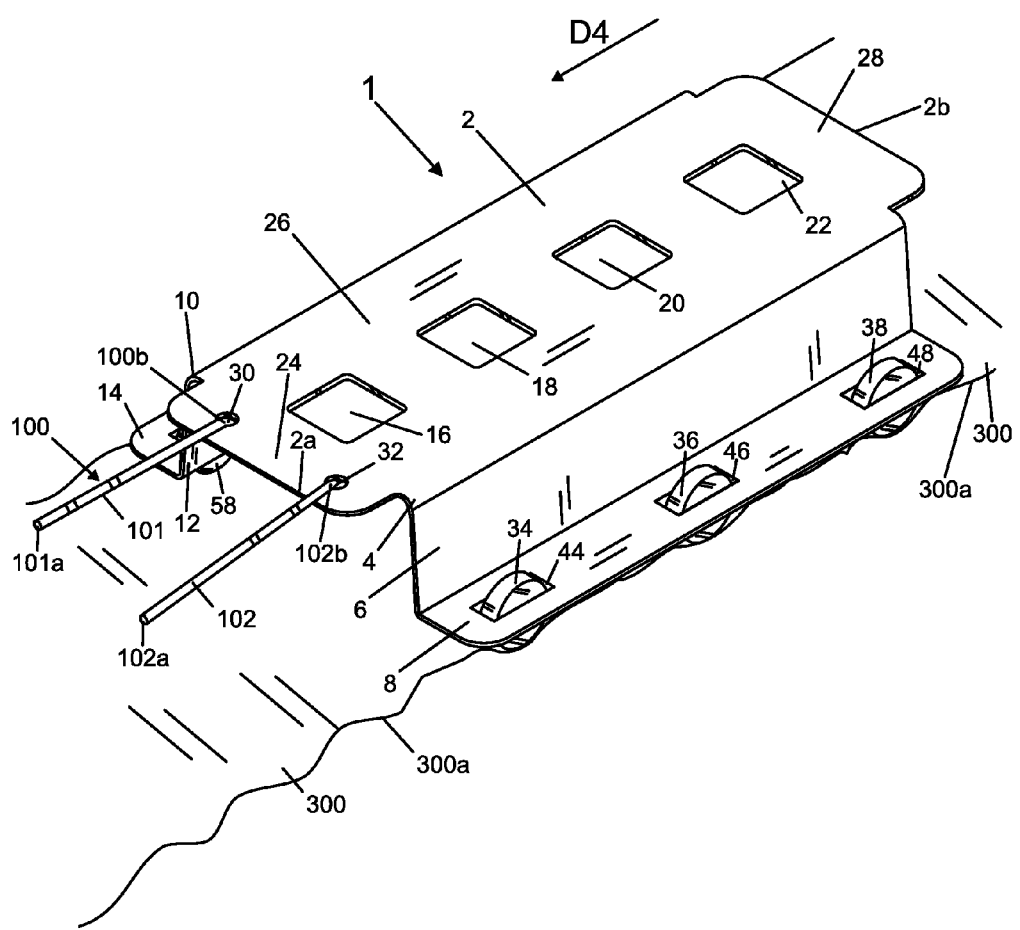
FIG. 11 shows a front, right, and top perspective view of the apparatus of FIG. 1, along with the rope of FIG. 10 connected to the apparatus of FIG. 1, and with the apparatus resting on an irregular sandy or beach surface.

The top plate 2 has openings 16, 18, 20, and 22, shown in FIG. 1. Each of the openings 16, 18, 20, and 22 may be square and may be used to insert objects or tie objects to the apparatus 1 for transporting. The top plate 2 also has openings 30 and 32 shown in FIGS. 1 and 2, which may be used for attaching a rope, such as a rope 100 including portions 101 and 102 shown in FIGS. 10-11, for pulling the apparatus 1 on a road 200 including a flat hard road surface 200a as shown in FIG. 10 or on a beach 300 having an irregular and/or sandy surface 300a as shown in FIG. 11. Each of the openings 30 and 32 may have a diameter D1 shown in FIG. 5, which may be about one inch.

The top plate 2 and curved portions 10 and 4 may have a combined width, W1 shown in FIG. 1, which may be about twelve inches in at least one embodiment. The openings 16, 18, 20, and 22 may be square and may have a width or side length of W3, which may be about four inches. Each of the slanted portions 6 and 12 may have a length L1, shown in FIG. 1, which may be about thirty inches. Each of the slanted portions 6 and 12 in combination with the respective curved portions 4 and 10, may have a height H2, shown in FIG. 8, which may be about six inches.

The right side plate 8 may have rectangular openings or slots 44, 46, and 48, shown in FIG. 1. The left side plate 14 may have rectangular openings or slots 64, 66, and 68 shown in FIG. 2. Each of slots 44, 46, 48, and 64, 66, and 68 may be about three and one half inches long by one and one half inches wide.

In at least one embodiment, the left side plate 14 includes a left side flat surface portion between any two adjacent wheels of the wheels 54, 56, and 58 which is greater in length than the diameter of any of the wheels 54, 56, and 58, and wherein the wheels 54, 56, and 58 rotate on axes, in a plane which is perpendicular to the left side flat surface portion. Similarly, in at least one embodiment, the right side plate 8 includes a right side flat surface portion between any two adjacent wheels of the wheels 34, 36, and 38 which is greater in length than the diameter of any of the wheels 34, 36, and 38, and wherein the wheels 34, 36, and 38 rotate on axes, in a plane which is perpendicular to the right side flat surface portion. This configuration, particularly the flat surface portions between adjacent wheels of the wheels 34, 36, 38, 54, 56, and 58, aid the apparatus 1 in sliding on sand, when the apparatus 1 is slid on a beach surface 300a.

The apparatus 1 includes structural reinforcement devices or ribs 70a-70g shown in FIGS. 3 and 72a-72g shown in FIG. 4. The ribs 70a-g and 72a-g, may be substantially triangular in shape with two small connecting sides connected to the curved portions 4 and 10, respectively, and with a large side opposite curved portions 4 and 10, having a length of about one inch.

The wheels 54, 56, and 58 may rotate about axles 51, 55, and 59 respectively, which are shown in FIG. 3. The axles 51, 55, and 59 are fixed to the left side plate 14 by members 53a-b, 57a-b, and 61a-b, respectively. Each of the members of members 53a-b, 57a-b, and 61a-b may be fixed to the left side plate 14, through an opening, by a screw or fastener, similar or analogous to opening 73a and fastener 73b as shown for member 33a fastened to right side plate 8 to fix the axle 31, as shown in FIG. 9.

The wheels 34, 36, and 38 may rotate about axles 31, 35, and 39 respectively, which are shown in FIG. 4. The axles 31, 35, and 39 are fixed to the right side plate 8 by members 33a-b, 37a-b, and 41a-b, respectively, as shown by FIG. 4. Each of the members of members 33a-b, 37a-b, and 41a-b may be fixed to the right side plate 8, through an opening, by a screw or fastener, similar, identical, or analogous to opening 73a and fastener 73b as shown for member 33a fastened to right side plate 8 to fix the axle 31, as shown in FIG. 9.

The axles 31, 35, 39, and 51, 55, and 59, although shown as uniform right circular cylinders, may have ends which are larger than their central portions, or may be capped at their ends, so that the axles 31, 35, 39, 51, 55, and 59 cannot slide out from the positions shown in FIGS. 3 and 4, after the fasteners, similar or identical to fastener 73b have attached the members 33a-b, 37a-b, 41a-b, 53a-b, 57a-b, and 61a-b in the manner shown by FIGS. 3 and 4.

Each of the wheels 34, 36, 38, and 54, 56, and 58 may have a diameter D2, as shown in FIG. 7 for wheel 58, which may be about three inches. The clearance height H1, from the bottom of the plate 14 to the bottom of the wheels 54, 56, and 58 and from the bottom of plate 8 to the bottom of wheels 34, 36, and 38, may be about one and eleven sixteenths inches.

As shown in FIG. 1, the apparatus 1 includes a lip portion 24 of the top plate 2 which protrudes out beyond the plates 6, 8, 12, and 14, towards an end 2a of the top plate 2. The apparatus 1 also includes a lip portion 28 which protrudes out beyond the plates 6, 8, 12, and 14, towards an end 2b, which is opposite end 2a, of the top plate 2, as shown in FIG. 1.

The apparatus 1 may have a total width of W5, which may be twenty inches, as shown in FIG. 8. The top plate 2, the portions 4 and 10, the slanted portions 6 and 12, and the side plates 8 and 14 may be made of hard plastic, such as from a copolymer and/or polypropylene. The top plate 2 may have a width of W6, shown in FIG. 7, of about ten inches.

As shown in FIG. 9, the member or strap 33a may include a U-shaped portion for holding the axle 31 and a straight portion with a hole 73a for receiving a fastener 73b. The plate 8, may have a hole which aligns with the hole 73a, and which receives the fastener 73b to connect and fix the member 33a or strap to the plate 8. The members 33b, 37a-b, 41a-b, 53a-b, 57a-b, and 61a-b may be identical to the member or strap 33a and may connect to the appropriate plate of plates 8 and/or 14 in the same or an analogous manner. Each of the members 33a-b 37a-b, 41a-b, 53a-b, 57a-b, and 61a-b may be made of a rigid hard material, such as metal, or a hard plastic. Each of the axles 31, 35, 39, and 51, 55, and 59 may be made of metal or a hard plastic.

The rope 100, having portions 101 and 102 shown in FIGS. 10 and 11, may be three quarter inch diameter rope, to reduce rope burns.

In operation, an individual may use his or her left hand to grab end 101a and his or her right hand to grab end 102a of the rope 100, in order to pull the apparatus 1 in the direction D3, shown in FIG. 10, along the flat hard road surface 200a of the road 100. In this example, the wheels 34, 36, 38, and 54, 56, and 58 roll on the surface 200a of the road 100.

When an individual gets to a beach or sandy surface 300a of a beach 300, shown in FIG. 11, the individual may use his or her left hand to grab end 100a and his or her right hand to grab end 102a of the rope 100, in order to pull the apparatus 1 in the direction D4, shown in FIG. 11, along the sandy surface 300a of the beach 300. In the example of FIG. 11, the wheels 34, 36, 38, and 54, 56, and 58 do not roll substantially on the surface 300a, however, the apparatus 1 slides along the beach surface 300a because although the wheels 34, 36, 38, 54, 56, and 58 may get stuck in the sand or hesitate in the sand, the flat bottom surfaces 8b of plate 8 and 14b of plate 14 allow the apparatus 1 to glide on the sand surface 300a.

The apparatus 1 allows an individual to transport many items to a beach along a hard surface road to a beach, such as road 200 and then to transport the items on the beach, such as along beach 300. Many people carry items, such as beach chairs, lunch, blanket, beach wear, coolers, and beach toys to the beach. The wide runners or plates 8 and 14 take over, substantially, and provide a gliding function, when wheels 34, 36, 38, 54, 56, and 58 hesitate or get stuck in the sand. In at least one embodiment, the width of the plates or runners 8 and 14 is critical, because it helps the apparatus to glide along the sand surface 300a and to provide stability. In at least one embodiment, the width W2 of each of the plates 8 and 14, shown in FIG. 1 for plate 8 (which may be identical to plate 14) may be about four inches, which may be about one fifth of the total width W5, twenty inches, of the apparatus 1, as shown in FIG. 8. Thus, the two plates 8 and 14 together may have a width of eight inches, which is about forty percent of the total width W5. This large portion of width for plates, or runners 8 and 14 is critical, in at least one embodiment, to help the apparatus 1 glide along sand surface 300a and provide stability.

Although the invention has been described by reference to particular illustrative embodiments thereof, many changes and modifications of the invention may become apparent to those skilled in the art without departing from the spirit and scope of the invention. It is therefore intended to include within this patent all such changes and modifications as may reasonably and properly be included within the scope of the present invention's contribution to the art.

I claim:

1. An apparatus comprising:
   a frame comprising:
   a top plate;
   a right spacing member;
   a left spacing member;
   a left side plate having a length and a width, wherein the length of the left side plate is substantially greater than the width of the left side plate;
   a right side plate having a length and a width, wherein the length of the right side plate is substantially greater than the width of the right side plate;
   wherein the top surface of the top plate is the uppermost surface of the frame;
   wherein the top plate does not extend laterally beyond the spacing members in a direction away from the longitudinal center line of the apparatus;
   wherein the left and right side plates do not extend laterally beyond the spacing members in a direction toward the longitudinal center line of the apparatus;
   a first wheel connected to the left side plate so that the first wheel can rotate about a first axis which is substantially parallel to the width of the left side plate;
   a second wheel connected to the left side plate so that the second wheel can rotate about a second axis which is substantially parallel to the width of the left side plate;
   a third wheel connected to the right side plate so that the third wheel can rotate about a third axis which is substantially parallel to the width of the right side plate;
   a fourth wheel connected to the right side plate so that the fourth wheel can rotate about a fourth axis which is substantially parallel to the width of the right side plate;
   wherein the top plate is connected to the left side plate by the left spacing member, so that the top plate is spaced apart from the left side plate;
   wherein the top plate is connected to the right side plate by the right spacing member, so that the top plate is spaced apart from the right side plate;
   wherein the left side plate includes a left side flat surface portion between the first wheel and the second wheel, which is greater in length than the diameter of either the first wheel or the second wheel, and wherein the first wheel and the second wheel rotate on the first axis and the second axis, respectively, in a plane which is perpendicular to the left side flat surface portion;
   wherein the right side plate includes a right side flat surface portion between the third wheel and the fourth wheel, which is greater in length than the diameter of either the third wheel or the fourth wheel, and wherein the third wheel and the fourth wheel rotate on the third axis and the fourth axis, respectively, in a plane which is perpendicular to the right side flat surface portion;
   wherein the first wheel, the second wheel, the third wheel, and the fourth wheel are configured so that they can be simultaneously placed in contact with a ground surface, so that each of the first, second, third, and fourth wheels can simultaneously roll on the ground surface;
   wherein when the first wheel, the second wheel, the third wheel, and the fourth wheel are simultaneously placed in contact with the ground surface, so that each of the first, second, third, and fourth wheels can simultaneously roll on the ground surface, the top plate lies substantially parallel to the ground surface and completely above the first, second, third, and fourth wheels;
   wherein the apparatus has a front and a rear, and wherein the first and third wheels are in the front of the apparatus and the second and fourth wheels are in the rear of the apparatus;
   wherein there is a distance between the first wheel at the front of the apparatus and the second wheel at the rear of the apparatus, and wherein the top plate spans a length of at least the distance between the first wheel and the second wheel; and
   wherein the top plate spans a width from a first end to a second end, wherein the first end is about the same distance from the first and the second wheels as the second end is from the third and fourth wheels.

2. The apparatus of claim 1 wherein
the top plate is about ten inches in width;
the left side plate is about four inches in width;
the right side plate is about four inches in width;

the right spacing member spaces the top plate away from the right side plate about six inches; and the left spacing member spaces the top plate away from the left side plate about six inches.

3. The apparatus of claim 1 wherein the left side plate includes a first slot, and wherein the first wheel is connected to the left side plate so that the first wheel has a portion which sits in the first slot, a portion which is above the first slot, and a portion which is below the first slot;

the left side plate includes a second slot, and wherein the second wheel is connected to the left side plate so that the second wheel has a portion which sits in the second slot, a portion which is above the second slot, and a portion which is below the second slot;

the right side plate includes a third slot, and wherein the third wheel is connected to the right side plate so that the third wheel has a portion which sits in the third slot, a portion which is above the third slot, and a portion which is below the third slot; and the right side plate includes a fourth slot, and wherein the fourth wheel is connected to the right side plate so that the fourth wheel has a portion which sits in the fourth slot, a portion which is above the fourth slot, and a portion which is below the fourth slot.

4. The apparatus of claim 1 wherein the top plate is substantially parallel to the left side plate and the right side plate.

5. The apparatus of claim 1 further comprising a rope; and a means for attaching the rope to the top plate, such that the rope can be used to pull a combination of the top plate, left spacing member, right spacing member, left side plate, and the right side plate.

6. The apparatus of claim 5 wherein the means for attaching the rope to the top plate includes at least one opening in the top plate.

7. The apparatus of claim 1 wherein the top plate has a lip portion which protrudes out beyond an end of the left side plate, and out beyond an end of the right side plate.

8. The apparatus of claim 6 wherein the top plate has a lip portion which protrudes out beyond an end of the left side plate, and out beyond an end of the right side plate; and wherein the at least one opening in the top plate is located in the lip portion.

9. The apparatus of claim 6 wherein the top plate includes a plurality of further openings; and wherein each of the plurality of further openings is substantially larger than the at least one opening.

10. The apparatus of claim 9 wherein the top plate has a length and a width, wherein the length of the top plate is substantially greater than the width of the top plate; and wherein each of the plurality of further openings is located centrally with respect to the width of the top plate.

11. A method comprising:

loading an apparatus with a plurality of items;

pulling the apparatus with the plurality of items along a hard road surface so that first, second, third, and fourth wheels of the apparatus roll; and pulling the apparatus with the plurality of items along a beach surface so that the first, second, third, and fourth wheels contact the beach surface;

wherein the apparatus includes:

a frame comprising:

a top plate;

a right spacing member;

a left spacing member;

a left side plate having a length and a width, wherein the length of the left side plate is substantially greater than the width of the left side plate;

a right side plate having a length and a width, wherein the length of the right side plate is substantially greater than the width of the right side plate;

wherein the top surface of the top plate is the uppermost surface of the frame;

wherein the top plate does not extend laterally beyond the spacing members in a direction away from the longitudinal center line of the apparatus;

wherein the left and right side plates do not extend laterally beyond the spacing members in a direction toward the longitudinal center line of the apparatus;

a first wheel connected to the left side plate so that the first wheel can rotate about a first axis which is substantially parallel to the width of the left side plate;

a second wheel connected to the left side plate so that the second wheel can rotate about a second axis which is substantially parallel to the width of the left side plate;

a third wheel connected to the right side plate so that the third wheel can rotate about a third axis which is substantially parallel to the width of the right side plate;

a fourth wheel connected to the right side plate so that the fourth wheel can rotate about a fourth axis which is substantially parallel to the width of the right side plate;

wherein the top plate is connected to the left side plate by the left spacing member, so that the top plate is spaced apart from the left side plate;

wherein the top plate is connected to the right side plate by the right spacing member, so that the top plate is spaced apart from the right side plate;

wherein the left side plate includes a left side flat surface portion between the first wheel and the second wheel, which is greater in length than the diameter of either the first wheel or the second wheel, and wherein the first wheel and the second wheel rotate on the first axis and the second axis, respectively, in a plane which is perpendicular to the left side flat surface portion;

wherein the right side plate includes a right side flat surface portion between the third wheel and the fourth wheel, which is greater in length than the diameter of either the third wheel or the fourth wheel, and wherein the third wheel and the fourth wheel rotate on the third axis and the fourth axis, respectively, in a plane which is perpendicular to the right side flat surface portion;

wherein the first wheel, the second wheel, the third wheel, and the fourth wheel are configured so that they can be simultaneously placed in contact with a ground surface, so that each of the first, second, third, and fourth wheels can simultaneously roll on the ground surface;

wherein when the first wheel, the second wheel, the third wheel, and the fourth wheel are simultaneously placed in contact with the ground surface, so that each of the first, second, third, and fourth wheels can simultaneously roll on the ground surface, the top plate lies substantially parallel to the ground surface and completely above the first, second, third, and fourth wheels;

wherein the apparatus has a front and a rear, and wherein the first and third wheels are in the front of the apparatus and the second and fourth wheels are in the rear of the apparatus;

wherein there is a distance between the first wheel at the front of the apparatus and the second wheel at the rear of the apparatus, and wherein the top plate spans a length of at least the distance between the first wheel and the second wheel; and wherein the top plate spans a width from a first end to a second end, wherein the first end is about the same distance from the first and the second wheels as the second end is from the third and fourth wheels.

12. The method of claim 11 wherein the top plate is about ten inches in width;

the left side plate is about four inches in width;

the right side plate is about four inches in width;

the right spacing member spaces the top plate away from the right side plate about six inches; and the left spacing member spaces the top plate away from the left side plate about six inches.

13. The method of claim 11 wherein the left side plate includes a first slot, and wherein the first wheel is connected to the left side plate so that the first wheel has a portion which sits in the first slot, a portion which is above the first slot, and a portion which is below the first slot;

the left side plate includes a second slot, and wherein the second wheel is connected to the left side plate so that the second wheel has a portion which sits in the second slot, a portion which is above the second slot, and a portion which is below the second slot;

the right side plate includes a third slot, and wherein the third wheel is connected to the right side plate so that the third wheel has a portion which sits in the third slot, a portion which is above the third slot, and a portion which is below the third slot; and the right side plate includes a fourth slot, and wherein the fourth wheel is connected to the right side plate so that the fourth wheel has a portion which sits in the fourth slot, a portion which is above the fourth slot, and a portion which is below the fourth slot.

14. The method of claim 11 wherein the top plate is substantially parallel to the left side plate and the right side plate.

15. The method of claim 11 further comprising a rope; and a means for attaching the rope to the top plate, such that the rope can be used to pull a combination of the top plate, left spacing member, right spacing member, left side plate, and the right side plate.

16. The method of claim 15 wherein the means for attaching the rope to the top plate includes at least one opening in the top plate.

17. The method of claim 11 wherein the top plate has a lip portion which protrudes out beyond an end of the left side plate, and out beyond an end of the right side plate.

18. The method of claim 16 wherein the top plate has a lip portion which protrudes out beyond an end of the left side plate, and out beyond an end of the right side plate;

and wherein the at least one opening in the top plate is located in the lip portion.

19. The method of claim 16 wherein the top plate includes a plurality of further openings; and wherein each of the plurality of further openings is substantially larger than the at least one opening.

20. The method of claim 19 wherein the top plate has a length and a width, wherein the length of the top plate is substantially greater than the width of the top plate; and wherein each of the plurality of further openings is located centrally with respect to the width of the top plate.

* * * * *